United States Patent [19]

Kako et al.

[11] Patent Number: 4,501,540
[45] Date of Patent: Feb. 26, 1985

[54] INSERT MOLDING DEVICE

[75] Inventors: Hiroyoshi Kako, Aichi; Nobuo Kobayashi; Toshiaki Kaneyuki, both of Toyota, all of Japan

[73] Assignee: Toyota Jidosha Kabushiki Kaisha, Toyota, Japan

[21] Appl. No.: 443,159

[22] Filed: Nov. 19, 1982

[30] Foreign Application Priority Data

Dec. 24, 1981 [JP] Japan ............................ 56-191774[U]

[51] Int. Cl.³ ............................................. B29C 6/04
[52] U.S. Cl. ..................................... 425/116; 249/93; 264/276; 264/328.9
[58] Field of Search ...................... 264/275, 328.9, 276, 264/272.15, 272.13, 272.16, 272.17, 278, 328.12, 264/161, 277; 425/116, 555, DIG. 34; 249/91, 94, 249/95, 93

[56] References Cited

U.S. PATENT DOCUMENTS

| | | | |
|---|---|---|---|
| 1,607,073 | 11/1926 | Grot | 264/275 |
| 2,537,089 | 1/1951 | Rempel | 425/116 |
| 2,604,661 | 7/1952 | Karnt | 425/116 |
| 2,724,868 | 11/1955 | Kish | 264/275 |
| 2,976,573 | 3/1961 | Davis | 264/275 |
| 3,238,287 | 3/1966 | Chapman | 264/276 |
| 3,328,846 | 7/1967 | Morin | 249/94 |
| 3,333,300 | 8/1967 | Cohan | 264/328.9 |
| 3,592,887 | 7/1971 | Edwards | 264/275 |
| 3,715,423 | 2/1973 | Dunn | 264/276 |
| 3,779,506 | 12/1973 | Adams | 249/95 |
| 3,814,777 | 6/1974. | Schmidt | 264/278 |
| 4,008,031 | 2/1977 | Weber | 264/2.2 |
| 4,197,266 | 4/1980 | Clark | 264/2.2 |

FOREIGN PATENT DOCUMENTS

| | | | |
|---|---|---|---|
| 54-152970 | 12/1979 | Japan | 264/272.17 |
| 55-3928 | 1/1980 | Japan | 264/161 |

Primary Examiner—James Lowe
Attorney, Agent, or Firm—Kenyon & Kenyon

[57] ABSTRACT

The insert molding device provides a lead groove communicating with a clearance between a cavity and an inserted workpiece in a mold used for molding a plastic coating on part of the workpiece so that excess molten plastic enters the lead groove. The resulting casting fin formed in the lead groove can be easily removed with an automatic machine, thereby reducing the cost of the final product.

6 Claims, 5 Drawing Figures

INSERT MOLDING DEVICE

BACKGROUND OF THE INVENTION

(1) Field of the Invention

The present invention relates to an insert molding device. More particularly, it relates to a device for coating the surface of a workpiece with plastic by means of insert molding.

(2) Description of the Prior Art

Recently, a jaw of a shifter fork, one of the parts of the transmission of an automobile, has been coated with plastic by means of insert molding in order to increase resistance to wear.

The problem of coating the jaw of a shifter fork with plastic in such a manner, results from the clearance between the mold and the workpiece inserted therein.

Because a number of inserted workpieces differ in shape and dimension, it is necessary to increase the clearance between the mold and the inserted workpiece. If the clearance is not increased, some of the workpieces cannot be inserted into the mold.

This increase in clearance naturally causes casting fins to form due to excess plastic entering the clearance after the plastic is injected into the mold.

The length of the casting fins varies depending on the shape and the dimensions of the inserted workpiece and the injection conditions, for example, the composition of the plastic, the temperature of the plastic, and the injection pressure of the plastic.

As a countermeasure to the formation of casting fins, for example, there is known a method in which a pair of molds is provided with sliding keys so that the clearance between the molds and the inserted workpiece is minimized.

According to this method, the workpiece inserted between the pair of molds is pressed down by a clamp pin, and sliding keys are disposed on each side of the inserted workpiece, the sliding keys sliding toward each other due to the descending of cams, mounted on the upper mold, when the molds are closed. Consequently, the clearance disappears. However, in this method, if any of the edges of the inserted workpieces are rounded, a clearance occurs in spite of the use of sliding keys.

A steel plate product, a forged product, and a cast product all will typically have rounded edges, and according to this method, the clearance due to the rounded corners cannot be eliminated.

Therefore, when molding is carried out under such conditions, casting fins are formed on the edges of the inserted work.

These casting fins are thin and do not adhere to the inserted workpiece and therefore must be cut off.

However, because it is difficult to cut them off by means of an automatic machine, they must be cut off manually, thereby decreasing productivity and increasing the cost of the product.

OBJECT AND SUMMARY OF THE INVENTION

The present invention is presented as a solution to the unavoidable forming of casting fins in the above-mentioned insert molding.

The object of the present invention is to provide an insert molding device in which casting fins formed at the time of molding can be removed after molding by means of an automatic machine, with the result that pre-working of a workpiece for insert molding is minimized, the productivity is improved, and the cost of machining and the cost of the product can be decreased.

According to the present invention, there is provided an insert molding device consisting of a pair of upper and lower molds in which a cavity to accommodate a workpiece is formed when the molds are combined, the cavity communicating with a pouring gate for injection of molten plastic and the shape of the cavity substantially corresponding to that of the workpiece, characterized in that there is provided at least one lead groove communicating with the cavity and extending outwardly from it so that excess molten plastic enters the lead groove.

Further, according to the preferred embodiment of the present invention, there is provided an insert molding device in which the lead groove for containing molten plastic is provided with a reservoir at the end thereof.

Still further, according to the preferred embodiment of the present invention, there is provided an insert molding device in which the cavity has grooves on each side of the bottom thereof so that thick coverings can be formed on each lower side of the workpiece and in which the upper mold is provided with a clamp pin which clamps the workpiece inserted into the cavity and prevents the molten plastic from entering the clearance between the molds and the workpiece, except for the clearance necessary to form the plastic covering on the surface of the workpiece, during injection molding.

According to the present invention, it is possible to easily remove with an automatic machine a casting fin inevitably formed in the process of insert molding due to the provision of a lead groove into which the molten plastic enters. Thus, the productivity can be improved, the cost of the product can be reduced, the number of lengths of the casting fins, due to the various quantities of plastic injected into the molds in accordance with the various shapes and dimensions of the inserted workpieces and to the various injection conditions, can be reduced, and the length of the caasting fins can be shortened.

Furthermore, by using the device of the present invention, it is possible to minimize pre-working of the inserted workpieces, thereby greatly decreasing the cost of the final product.

DETAILED DESCRIPTION OF THE PREFERRED EMBODIMENT

The known casting fin eliminating device will first be described so as to clarify the difference between the preferred embodiment of the present invention and the conventional technique.

Figure 1:
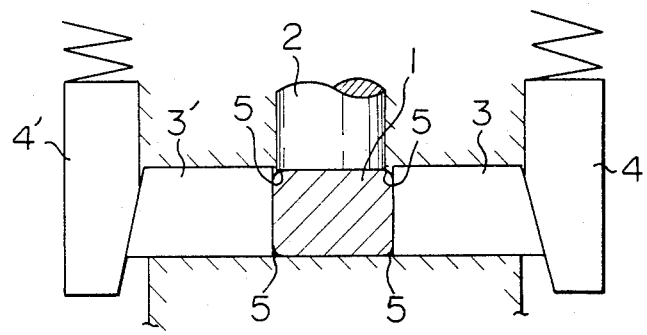
FIG. 1 is a cross section of a known casting fin eliminating device.

The above-mentioned casting fin eliminating device is illustrated in FIG. 1. A workpiece 1 inserted between a pair of molds is pressed down by a clamp pin 2, and sliding keys 3 and 3' are disposed on each side of the inserted workpiece. The sliding keys 3 and 3' slide toward each other due to the descending of cams 4 and 4', mounted on the upper mold, when the molds are closed, and consequently, the clearance between the molds and the inserted workpiece is eliminated.

However, in this method, if there are any rounded edges on the inserted workpiece 1, a clearance 5 occurs in spite of the use of the sliding keys 3 and 3'. Therefore, casting fins are formed along the edges of the inserted workpiece.

Because these casting fins are thin and do not adhere to the inserted workpiece 1, they must be cut off. However, it is difficult to cut them off with an automatic machine.

The structure of the present invention will now be described with reference to a preferred embodiment illustrated in FIGS. 2 to 4.

Figure 2:
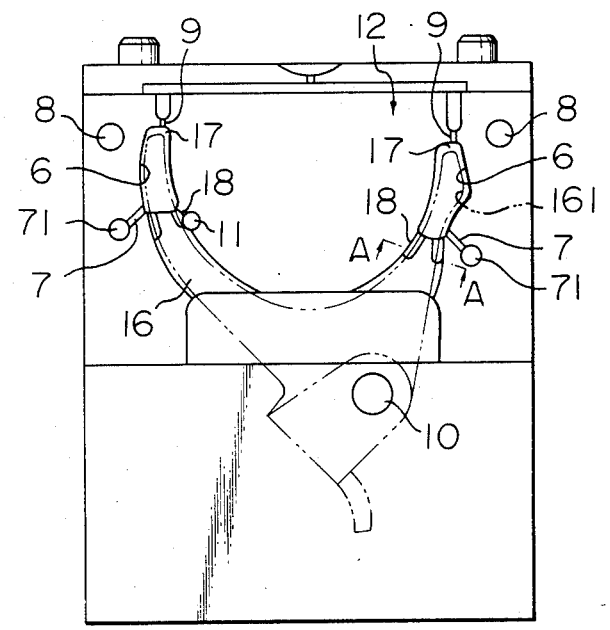
FIG. 2 is a front view of a lower mold used in a preferred embodiment of the present invention.

FIG. 2 is a face view of a lower mold. As used herein, lower mold and upper mold are convenient terms of art referring to the stationary and moving parts of a mold, and no specific positional orientation is implied. Reference numeral 12 represents all of the lower mold. An inserted workpiece, for example, a shifter fork 16, is accommodated in the lower mold 12. Reference numeral 161 represents a jaw of the shifter fork 16, which jaw 161 will be coated with a plastic covering 17 by means of insert molding. Reference numeral 6 represents a cavity, i.e., a diesinking part, formed in the mold 12, which is formed in a shape similar to that of the jaw 161 of the shifter fork 16. Reference numeral 7 represents a lead groove disposed on the side of the diesinking part 6, and one end of which is communicated with the clearance between the mold 12 and the inserted workpiece (shifter fork) 16, the lead groove 7 having a reservoir 71 at the other end thereof for containing excess molten plastic. Reference numeral 8 represents a guide post for locating the upper mold 15 (FIG. 4) with respect to the lower mold 12, and reference numeral 9 represents a lead gate which conveys molten plastic to the cavity 6. Reference numerals 10 and 11 represent pins by which the inserted workpiece (the shifter fork) 16 is located in the molds.

Figure 3:
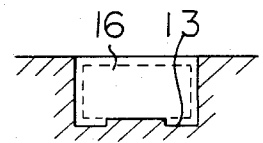
FIG. 3 is a cross sectional view of the lower mold in FIG. 2 taken along the line A—A;·

FIG. 3 shows the shape of a cross section of a recess in the lower mold 12 in which the inserted workpiece (the shifter fork) 16 is accommodated. Reference numeral 13 represents grooves provided on each side of the base of the recess in order to form thick tabs 18 (about 0.5 mm in thickness) connected to the covering 17 of the jaw 161.

Figure 4:
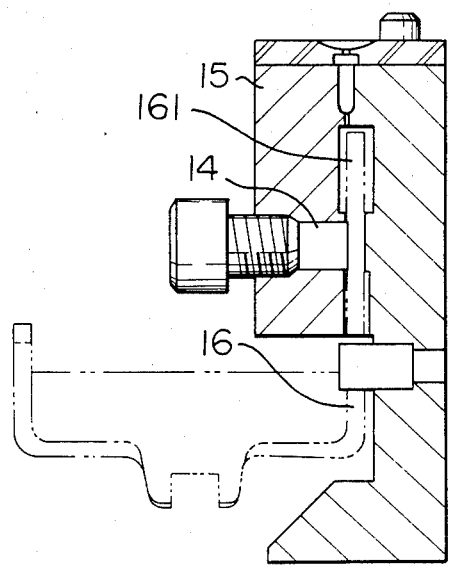
FIG. 4 is a sectional side elevational view of a pair of injection molds (an upper mold and a lower mold) combined in the embodiment.

FIG. 4 is a sectional side elevational view of the molds where an upper mold 15 is combined with the lower mold 12 shown in FIG. 2. Reference numeral 14 represents a pin which clamps the inserted workpiece, i.e., the shifter fork 16. The pin 14 also eliminates the clearance between the molds and the workpiece to prevent plastic from passing beyond the clearance provided by the cavity 6 to form the plastic covering 17 on the surface of the jaw 161 during injection molding.

To coat the jaw 161 of the shifter fork 16 with plastic by means of insert molding, the shifter fork 16 is accommodated in the lower mold 12, and the upper mold 15 is closed onto the lower mold 12, as shown in FIG. 4. Then molten plastic is injected into the diesinking part 6 through the gate 9 and forms the plastic covering 17, having a predetermined thickness, on the jaw 161 of the shifter fork 16 in cavity 6. In addition, the molten plastic is further forced to enter the clearance between the molds and the workpiece beyond thhe cavity 6 due to the injection pressure. However, because the lead groove 7 is provided, excess plastic is led into the lead groove 7 and the reservoir 71 at the end of the lead groove 7, thereby creating a casting fin, and the pressure of the molten plastic is reduced so that most of the excess plastic is prevented from entering the other clearance.

The plastic which does not enter the other clearance flows into the groove 13 to form thick coverings 18 having an L or U shaped section on each side of the shifter fork 16.

Further, since there is no danger of the thck coverings 18 entering other parts of the transmission due to exfoliation and thereby interfering with the operation of the shifter fork, it is not necessary to remove the coverings 18. Thus, they are left intact as parts of the product.

After the molten plastic has cooled down and become solid, the upper mold 15 and the lower mold 12 are separated from each other, the shifter fork 16, with the jaw 161 coated with the plastic covering 17, is taken out, a casting fin (the portion formed in the lead groove 7) connected to the covering 17 is removed, and a final product is obtained.

The casting fin can be removed by means of an automatic machine since the greater part of the casting fin formed according to the above-mentioned embodiment extends away from the shifter fork. The time required to remove the casting fin is as short as 30 seconds per product.

Figure 5:
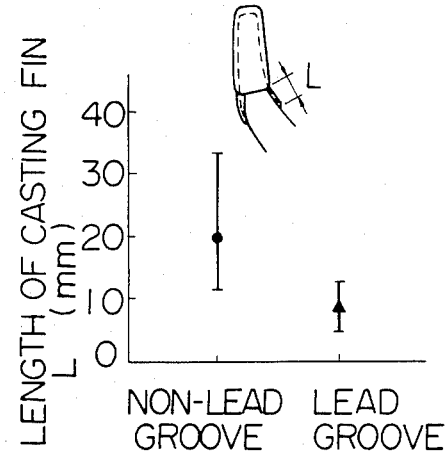
FIG. 5 is a graph showing the effect of providing a lead groove into which excess molten plastic enters.

FIG. 5 is a graph showing the length of casting fins as formed in the device according to the present invention as compared with casting fins as formed in the known device. From this figure, it is obvious that the device provided with a lead groove for the casting fin according to the present invention is superior to the known device.

We claim:

1. An insert molding device for covering a portion of a workpiece with a plastic material, the device including an upper mold and a lower mold having surfaces that mate together to form a cavity for receiving, with a small clearance to accommodate variations within manufacturing tolerances, an inserted workpiece of preselected size and shape, a portion of the cavity being enlarged to provide a molding chamber of increased clearance surrounding a predetermined region of an inserted workpiece, an injection gate having an outlet opening into the molding chamber for delivering molten plastic material under pressure to said chamber for molding a plastic covering on said predetermined region of an inserted workpiece, and a clamping pin having an end extending through the wall of the cavity outside of but adjacent to the molding chamber, said end conforming to the surface of an inserted workpiece for pressing the workpiece against the opposite wall of the cavity for eliminating any extrusion of a thin flash of excess plastic material from the molding chamber in the region where the clamping pin contacts the workpiece and where the workpiece contacts the opposite wall of the cavity, wherein the improvement comprises:

at least one groove formed in the surface of the cavity outside the molding chamber between the clamping pin and the portion of the opposite wall of the cavity adapted to be contacted by an inserted workpiece, the groove communicating with the molding chamber, such that excess plastic material injected into the molding chamber will flow into said at least one groove in preference to said small clearance to form a thick extension, defined by said groove, of said plastic covering molded on the predetermined surface portion of an inserted workpiece instead of a thin flash in the region of the small clearance.

2. An insert molding device according to claim 1, wherein said at least one groove comprises a pair of grooves, one groove being formed in the surface of the cavity on one side of the portion adapted to be contacted by an inserted workpiece and the other groove being formed in the surface of the cavity on the other side of the portion adapted to be contacted by an inserted workpiece.

3. An insert molding device according to claim 2, wherein the inserted workpiece has a substantially rectangular cross section with four substantially flat faces, said end of the clamping pin conforming to and adapted to press against one of said flat faces, the opposite wall of the cavity conforming to the flat face opposite said one flat face, and said pair of grooves are formed on each side of said opposite wall of the cavity.

4. An insert molding device according to claim 1, the device further comprising an enlarged reservoir spaced from the cavity and communicating with said molding chamber.

5. An insert molding device for covering a portion of a workpiece with a plastic material, the device including an upper mold and a lower mold having surfaces that mate together to form a cavity for receiving, with a small clearance to accommodate variations within manufacturing tolerances, an inserted workpiece of preselected size and shape, a portion of the cavity being enlarged to provide a molding chamber of increased clearance surrounding a predetermined region of an inserted workpiece, an injection gate having an outlet opening into the molding chamber for delivering molten plastic material under pressure to said chamber for molding a plastic covering on said predetermined region of an inserted workpiece, and a clamping pin having an end extending through the wall of the cavity outside of but adjacent to the molding chamber, said end conforming to the surface of an inserted workpiece for pressing the workpiece against the opposite wall of the cavity for eliminating any extrusion of a thin flash of excess plastic material from the molding chamber in the region where the claping pin contacts the workpiece and where the workpiece contacts the opposite wall of the cavity, wherein the improvement comprises:
- a lead groove formed in the mating surface of one of the molds, the lead groove communicating with the molding cavity and extending away from the cavity, whereby excess molten plastic material injected into the molding chamber can flow into said lead groove to form a casting fin that extends outwardly from the plastic covering and from the workpiece, and
- at least one groove formed in the surface of the cavity outside the molding chamber between the clamping pin and the portion of the opposite wall of the cavity adapted to be contacted by an inserted workpiece, the groove communicating with the molding chamber, such that any further excess plastic material injected into the molding chamber will flow into said at least one groove in preference to said small clearance to form a thick extension, defined by said groove, of said plastic covering molded on the predetermined surface portion of an inserted workpiece instead of a thin flash in the region of the small clearance.

6. An insert molding device for covering a portion of a workpiece with a plastic material, the device including an upper mold and a lower mold having surfaces that mate together to form a cavity for receiving, with a small clearance to accommodate variations within manufacturing tolerances, an inserted workpiece of preselected size and shape, a portion of the cavity being enlarged to provide a molding chamber of increased clearance surrounding a predetermined region of an inserted workpiece, an injection gate having an outlet opening into the molding chamber for delivering molten plastic material under pressure to said chamber for molding a plastic covering on said predetermined region of an inserted workpiece, and a clamping pin having an end extending through the wall of the cavity outside of but adjacent to the molding chamber, said end conforming to the surface of an inserted workpiece for pressing the workpiece against the opposite wall of the cavity for eliminating any extrusion of a thin flash of excess plastic material from the molding chamber in the region where the clamping pin contacts the workpiece and where the workpiece contacts the opposite wall of the cavity, wherein the improvement comprises:
- a lead groove formed in the mating surface of one of the molds, the lead groove communicating with the molding cavity and extending away from the cavity, whereby excess molten plastic material injected into the molding chamber can flow into said lead groove to form a casting fin that extends outwardly from the plastic covering and from the workpiece;
- an enlarged reservoir spaced from the cavity and communicating with said lead groove; and
- at least one groove formed in the surface of the cavity outside the molding chamber between the clamping pin and the portion of the opposite wall of the cavity adapted to be contacted by an inserted workpiece, the groove communicating with the molding chamber, such that excess plastic material injected into the molding cavity will flow into said at least one groove in preference to said small clearance to form a thick extension, defined by said groove, of said plastic covering molded on the predetermined surface portion of an inserted workpiece instead of a thin flash in the region of the small clearance.

* * * * *